United States Patent
Kondo

(10) Patent No.: US 11,456,015 B2
(45) Date of Patent: Sep. 27, 2022

(54) DERIVATION DEVICE, DERIVATION METHOD, DERIVATION PROGRAM, AND MAGNETIC TAPE

(71) Applicant: FUJIFILM CORPORATION, Tokyo (JP)

(72) Inventor: Michitaka Kondo, Tokyo (JP)

(73) Assignee: FUJIFILM CORPORATION, Tokyo (JP)

( * ) Notice: Subject to any disclaimer, the term of this patent is extended or adjusted under 35 U.S.C. 154(b) by 0 days.

(21) Appl. No.: 17/409,803

(22) Filed: Aug. 24, 2021

(65) Prior Publication Data

US 2021/0383834 A1 Dec. 9, 2021

Related U.S. Application Data

(63) Continuation of application No. PCT/JP2020/009134, filed on Mar. 4, 2020.

(30) Foreign Application Priority Data

Mar. 27, 2019 (JP) .............................. JP2019-060261

(51) Int. Cl.
  *G11B 20/10* (2006.01)
  *G11B 20/12* (2006.01)
  *G11B 5/008* (2006.01)

(52) U.S. Cl.
  CPC ...... *G11B 20/1201* (2013.01); *G11B 5/00813* (2013.01); *G11B 2020/1278* (2013.01)

(58) Field of Classification Search
  None
  See application file for complete search history.

(56) References Cited

U.S. PATENT DOCUMENTS 3,604,992 A * 9/1971 Audeh ................... G11B 15/58
                      318/7
5,448,423 A * 9/1995 Best ......................... G11B 5/09
(Continued)

FOREIGN PATENT DOCUMENTS

CN     1725361 A    1/2006
CN     1828737 A    9/2006
(Continued)

OTHER PUBLICATIONS

International Search Report issued in International Application No. PCT/JP2020/009134 dated May 12, 2020.
(Continued)

*Primary Examiner* — Peter Vincent Agustin
(74) *Attorney, Agent, or Firm* — Solaris Intellectual Property Group, PLLC

(57) ABSTRACT

A derivation device is a device that derives a reading path by a reading element in a case where plural pieces of data to be read are read from a recording medium, and includes a first derivation unit that derives a value representing a recording density of the data for each of plural areas in which the plural pieces of the data to be read are recorded, and a second derivation unit that derives a path for sequentially reading the data as the reading path for an area in which the value representing the recording density is equal to or larger than a predetermined threshold value and derives the reading path according to a predetermined path determination method for an area in which the value representing the recording density is less than the threshold value.

7 Claims, 9 Drawing Sheets

(56) References Cited

U.S. PATENT DOCUMENTS

| | | | |
|---|---|---|---|
| 6,188,532 B1* | 2/2001 | Albrecht | G11B 5/00878 360/75 |
| 2004/0105349 A1* | 6/2004 | Seo | G11B 27/329 369/13.56 |
| 2006/0164963 A1 | 7/2006 | Yoo et al. | |
| 2008/0059718 A1 | 3/2008 | Tajima et al. | |
| 2008/0310827 A1 | 12/2008 | Ninomiya et al. | |
| 2012/0154946 A1 | 6/2012 | Katagiri et al. | |
| 2012/0162807 A1 | 6/2012 | Katagiri et al. | |
| 2012/0250176 A1 | 10/2012 | Katagiri et al. | |
| 2014/0137138 A1* | 5/2014 | Janssen | G11B 15/61 720/695 |
| 2014/0268399 A1 | 9/2014 | Katagiri et al. | |
| 2015/0108216 A1 | 4/2015 | Nakajima et al. | |
| 2016/0117111 A1 | 4/2016 | Katagiri et al. | |
| 2021/0383834 A1* | 12/2021 | Kondo | G11B 20/1201 |

FOREIGN PATENT DOCUMENTS

| | | |
|---|---|---|
| CN | 101329887 A | 12/2008 |
| CN | 104054127 A | 9/2014 |
| JP | H11-66076 A | 3/1999 |
| JP | 2008-059438 A | 3/2008 |
| JP | 2010-097646 A | 4/2010 |
| JP | 2012-009105 A | 1/2012 |
| JP | 2012-128937 A | 7/2012 |
| JP | 2014-179140 A | 9/2014 |
| JP | 2018-190393 A | 11/2018 |
| WO | 2013/146863 A1 | 10/2013 |

OTHER PUBLICATIONS

Written Opinion of the ISA issued in International Application No. PCT/JP2020/009134 dated May 12, 2020.
English language translation of the following: Office action dated Mar. 23, 2022 from the SIPO in a Chinese patent application No. 202080016259.9 corresponding to the instant patent application. This office action translation is submitted now in order to supplement the understanding of the cited references which are being disclosed in the instant Information Disclosure Statement.
Extended European Search Report dated May 11, 2022, issued in corresponding EP Patent Application No. 20779408.2.
English language translation of the following: Office action dated Jul. 5, 2022 from the JPO in a Japanese patent application No. 2021-508911 corresponding to the instant patent application.

* cited by examiner

FIG. 9

| | | | | |
|---|---|---|---|---|
| 1 | data | data | | data |
| 2 | data | | | |
| 3 | | data | | |
| 4 | data | | | data |

FIG. 10

| | PATTERN 1 | PATTERN 2 | PATTERN 3 | PATTERN 4 | PATTERN 5 | PATTERN 6 | PATTERN 7 | PATTERN 8 | PATTERN 9 | PATTERN 10 |
|---|---|---|---|---|---|---|---|---|---|---|
| TRACK 1 | ■ | | | | ■ | | | ■ | | ■ |
| TRACK 2 | | ■ | | | ■ | ■ | | ■ | ■ | |
| TRACK 3 | | | ■ | | | ■ | ■ | ■ | ■ | ■ |
| TRACK 4 | | | | ■ | | ■ | | ■ | ■ | ■ |

…

DERIVATION DEVICE, DERIVATION METHOD, DERIVATION PROGRAM, AND MAGNETIC TAPE

CROSS-REFERENCE TO RELATED APPLICATIONS

This application is a continuation application of International Application No. PCT/JP2020/009134, filed on Mar. 4, 2020, the disclosure of which is incorporated herein by reference in its entirety. Further, this application claims priority from Japanese Patent Application No. 2019-060261, filed on Mar. 27, 2019, the disclosure of which is incorporated herein by reference in its entirety.

BACKGROUND

Technical Field

The present disclosure relates to a derivation device, a derivation method, a non-transitory storage medium storing a derivation program, and a magnetic tape.

Related Art

In the related art, a method of determining a reading path of a plurality of pieces of data stored in a tape medium has been disclosed (refer to JP2012-128937A). In this method, a nearest neighbor method or a pairwise exchange method is used as the method of determining the reading path.

However, in a case where data to be read is read by the reading path determined by the determination method of the reading path, such as the nearest neighbor method or the pairwise exchange method, a data reading time may not necessarily be shortened.

SUMMARY

The present disclosure has been made in view of the above circumstances and provides a derivation device, a derivation method, a non-transitory storage medium storing a derivation program, and a magnetic tape capable of shortening a reading time of data recorded on a recording medium.

A first aspect of the present disclosure is a derivation device, which derives a reading path by a reading element in a case where a plurality of pieces of data to be read are read from a recording medium, comprising a first derivation unit that derives a value representing a recording density of the data for each of a plurality of areas in which the plurality of pieces of the data to be read are recorded, and a second derivation unit that derives a path for sequentially reading the data as the reading path for an area in which the value representing the recording density is equal to or larger than a predetermined threshold value and derives the reading path according to a predetermined path determination method for an area in which the value representing the recording density is less than the threshold value.

In the derivation device of the first aspect, the threshold value may be a value that is smaller as the area is wider.

In the derivation device of the first aspect, the value representing the recording density may be a ratio of the number of pieces of the data to be read to the number of pieces of data capable of being recorded in the area, or a ratio of a size of the data to be read to a size of the data capable of being recorded in the area.

In the derivation device of the first aspect, in a case where a first area having the value representing the recording density equal to or larger than the threshold value is present adjacently in front of a second area having the value representing the recording density less than the threshold value, the second derivation unit may derive the reading path according to the path determination method with an end position of the reading element in the first area as a start position of the reading element in the second area, and in a case where the first area is present adjacently behind the second area, the second derivation unit may derive the reading path according to the path determination method with the start position of the reading element in the first area as the end position of the reading element in the second area.

In the derivation device of the first aspect, the first derivation unit may derive the value representing the recording density with each of all combinations of two or more consecutive areas in the plurality of areas as one area, in addition to each of the plurality of areas, and the second derivation unit may use a union of areas in which the value representing the recording density is equal to or larger than the threshold value, among all areas from which the value representing the recording density is derived by the first derivation unit, as an area in which the value representing the recording density is equal to or larger than the threshold value.

In the derivation device of the first aspect, the recording medium may be a magnetic tape.

A second aspect of the present disclosure is a derivation method of deriving a reading path by a reading element in a case where a plurality of pieces of data to be read is read from a recording medium, comprising deriving a value representing a recording density of the data for each of a plurality of areas in which the plurality of pieces of the data to be read are recorded, and deriving a path for sequentially reading the data as the reading path for an area in which the value representing the recording density is equal to or larger than a predetermined threshold value and deriving the reading path according to a predetermined path determination method for an area in which the value representing the recording density is less than the threshold value.

A third aspect of the present disclosure is a non-transitory storage medium storing a program that causes a computer to perform derivation processing that derives a reading path by a reading element in a case where a plurality of pieces of data to be read is read from a recording medium, the derivation processing including: deriving a value representing a recording density of the data for each of a plurality of areas in which the plurality of pieces of the data to be read are recorded, and deriving a path for sequentially reading the data as the reading path for an area in which the value representing the recording density is equal to or larger than a predetermined threshold value and deriving the reading path according to a predetermined path determination method for an area in which the value representing the recording density is less than the threshold value.

A fourth aspect of the present disclosure is a magnetic tape comprising a plurality of areas in which a plurality of pieces of data to be read are recorded, in which the plurality of areas are configured such that a reading element reads the data according to a path for sequentially reading the data for an area in which a value representing a recording density of the data, which is derived for each of the plurality of areas, is equal to or larger than a predetermined threshold value, and the reading element reads the data according to a reading path derived according to a predetermined path determination method for an area in which the value representing the recording density is less than the threshold value.

A fifth aspect of the present disclosure is a derivation device comprising a memory that stores a command to be executed by a computer that derives a reading path by a reading element in a case where a plurality of pieces of data to be read is read from a recording medium and a processor configured to execute the stored command, in which the processor derives a value representing a recording density of the data for each of a plurality of areas in which the plurality of pieces of the data to be read are recorded, and derives a path for sequentially reading the data as the reading path for an area in which the value representing the recording density is equal to or larger than a predetermined threshold value and derives the reading path according to a predetermined path determination method for an area in which the value representing the recording density is less than the threshold value.

According to the present disclosure, it is possible to shorten the reading time of the data recorded on the recording medium.

BRIEF DESCRIPTION OF THE DRAWINGS

FIG. 9 is a diagram showing an example of a state in which the data to be read is stored in four data tracks.

FIG. 10 is a diagram for describing processing of deriving a value representing a recording density.

DETAILED DESCRIPTION

Hereinafter, embodiments for implementing a technique of the present disclosure will be described in detail with reference to drawings.

First Embodiment

Figure 1:
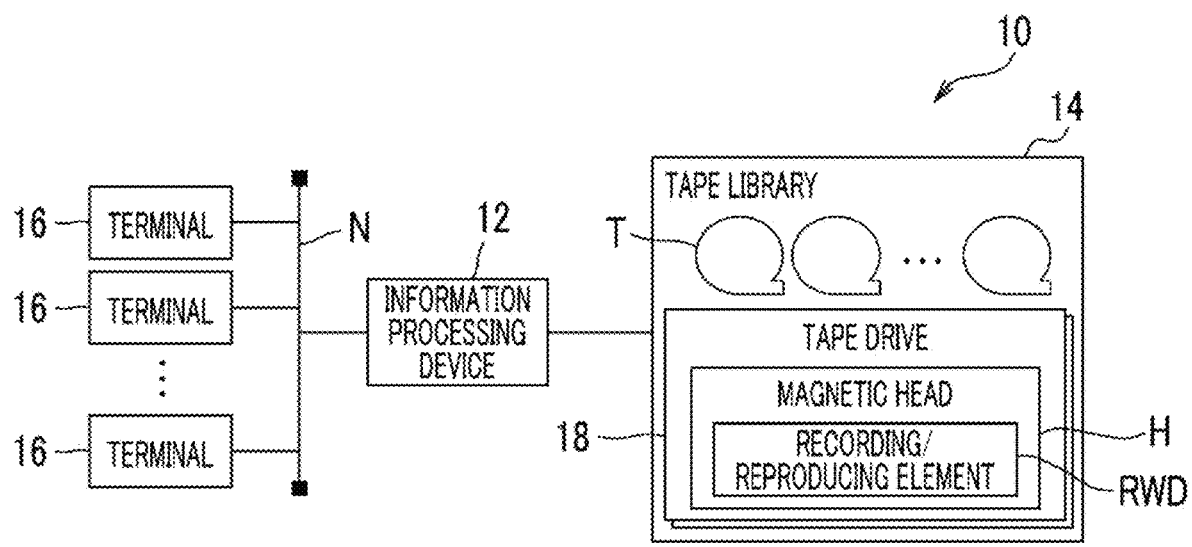
FIG. 1 is a block diagram showing an example of a configuration of a recording/reading system according to each embodiment.

First, a configuration of a recording/reading system 10 according to the present embodiment will be described with reference to FIG. 1. As shown in FIG. 1, the recording/reading system 10 includes an information processing device 12 and a tape library 14. The tape library 14 is connected to the information processing device 12. The information processing device 12 and a plurality of terminals 16 are connected to a network N and can communicate through the network N.

The tape library 14 comprises a plurality of slots (not shown) and a plurality of tape drives 18, and a magnetic tape T as an example of a recording medium is stored in each slot. An example of the magnetic tape T includes a linear tape-open (LTO) tape.

The tape drive 18 comprises a magnetic head H. The magnetic head H comprises a recording/reproducing element RWD that records and reproduces data on the magnetic tape T. The recording of data here means writing of data, and the reproducing of data means reading of data. The recording/reproducing element RWD is an example of a reading element that reads the data recorded on the recording medium according to the disclosed technique.

In a case where the information processing device 12 writes or reads the data on the magnetic tape T, the magnetic tape T to be written or read is loaded from the slot into any one of the tape drives 18. In a case where the information processing device 12 completes the writing or reading for the magnetic tape T loaded into the tape drive 18, the magnetic tape T is unloaded from the tape drive 18 to the originally stored slot.

Figure 2:
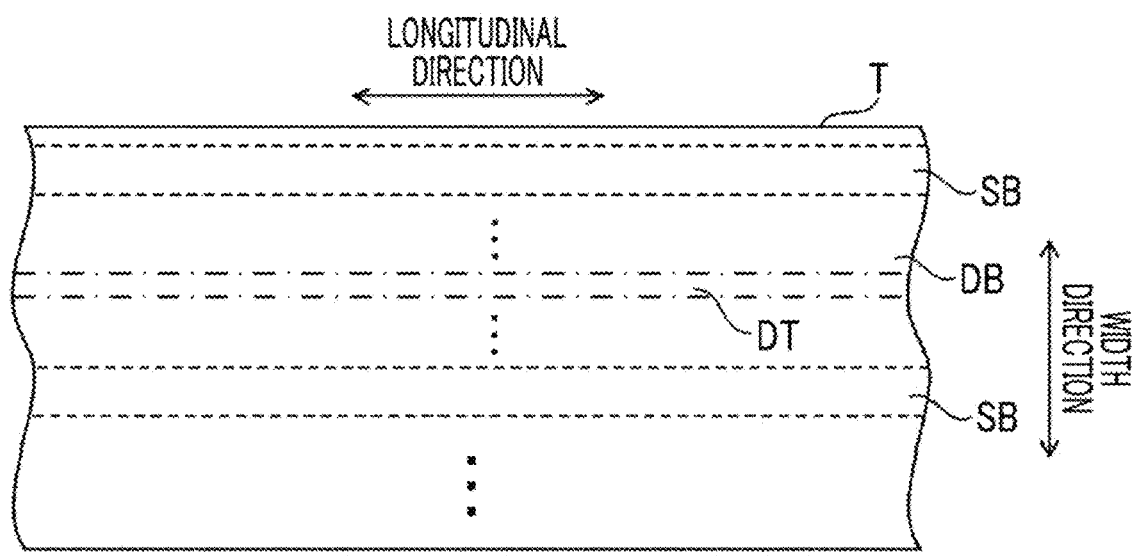
FIG. 2 is a plan view of an example of a magnetic tape according to each embodiment.

Next, a configuration of the magnetic tape T according to the present embodiment will be described with reference to FIG. 2. As shown in FIG. 2, a plurality of servo bands SB are formed on the magnetic tape T along a longitudinal direction of the magnetic tape T. The longitudinal direction of the magnetic tape T corresponds to a drawing-out direction of the magnetic tape T. The plurality of servo bands SB are formed so as to be arranged at equal intervals in a width direction of the magnetic tape T. Hereinafter, the longitudinal direction of the magnetic tape T is referred to as a tape longitudinal direction, and the width direction of the magnetic tape T is referred to as a tape width direction.

A servo pattern for positioning the magnetic head H in the tape width direction is recorded in the servo band SB. A data band DB in which the data is recorded is formed between adjacent servo bands SB. The data band DB comprises a plurality of data tracks DT in which the recording/reproducing element RWD writes and reads the data.

Figure 3:
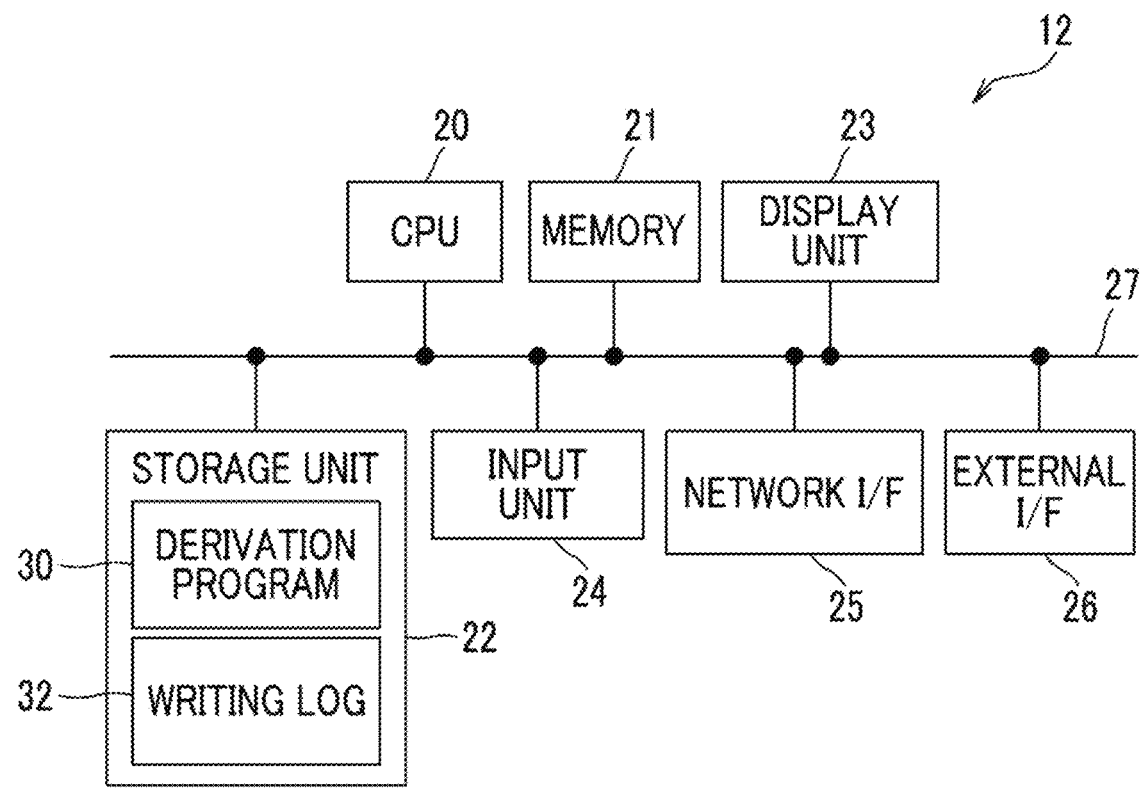
FIG. 3 is a block diagram showing an example of a hardware configuration of an information processing device according to each embodiment.

Next, a hardware configuration of the information processing device 12 according to the present embodiment will be described with reference to FIG. 3. As shown in FIG. 3, the information processing device 12 includes a central processing unit (CPU) 20, a memory 21 as a temporary storage area, and a nonvolatile storage unit 22. The information processing device 12 includes a display unit 23 such as a liquid crystal display, an input unit 24 such as a keyboard and a mouse, a network interface (I/F) 25 connected to the network N, and an external I/F 26 connected to the tape library 14. The CPU 20, the memory 21, the storage unit 22, the display unit 23, the input unit 24, the network I/F 25, and the external I/F 26 are connected to a bus 27.

The storage unit 22 is formed by a hard disk drive (HDD), a solid state drive (SSD), a flash memory, and the like. The storage unit 22 as a storage medium stores a derivation program 30. The CPU 20 reads out the derivation program 30 from the storage unit 22, develops the program in the memory 21, and executes the developed derivation program 30. An example of the information processing device 12 includes a server computer. The information processing device 12 is an example of a derivation device according to the disclosed technology.

The storage unit 22 stores a writing log 32. The writing log 32 includes information that can distinguish a recording order of the data recorded on the magnetic tape T and a size of the data, for each magnetic tape T.

Figure 4:
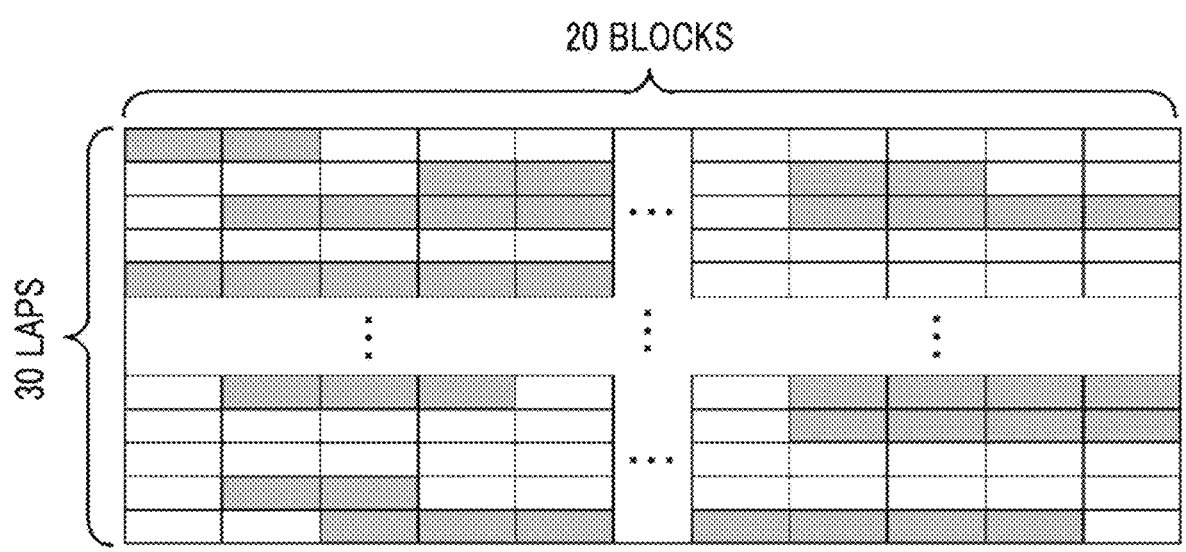
FIG. 4 is a plan view for describing a reading time of data from the magnetic tape.

By the way, as an example, a data reading time in a case where the data to be read is recorded in an area of 30 laps×20 virtual blocks of the magnetic tape T is considered as shown in FIG. 4. In the example of FIG. 4, the data to be read is indicated by a rectangle filled with gray. One lap here means one data track DT in which the data is written, and one virtual block means one virtual block having a predetermined size in one lap. For example, in a case where one lap is 100 GB and one virtual block is 5 GB, one lap is 20 virtual blocks.

In order to make the contents easier to understand, a time required for each of the following operations (1) to (3) in a case where the recording/reproducing element RWD reads the data recorded on the magnetic tape T is one unit time.

(1) Reading data for one virtual block (that is, moving the magnetic head H for one virtual block)

(2) Switching a reading direction along the tape longitudinal direction of the magnetic head H at an end portion of the data track DT in the tape longitudinal direction (3) Moving to a next data track DT That is, for example, in a case where the reading to the end portion of a certain data track DT in the tape longitudinal direction ends, it takes one unit time to move to the data track next to the magnetic head H and it takes one unit time to switch the reading direction along the tape longitudinal direction of the magnetic head H. Therefore, in this case, it takes a total of 2 unit times to start reading the data recorded in the adjacent data track DT.

Figure 5:
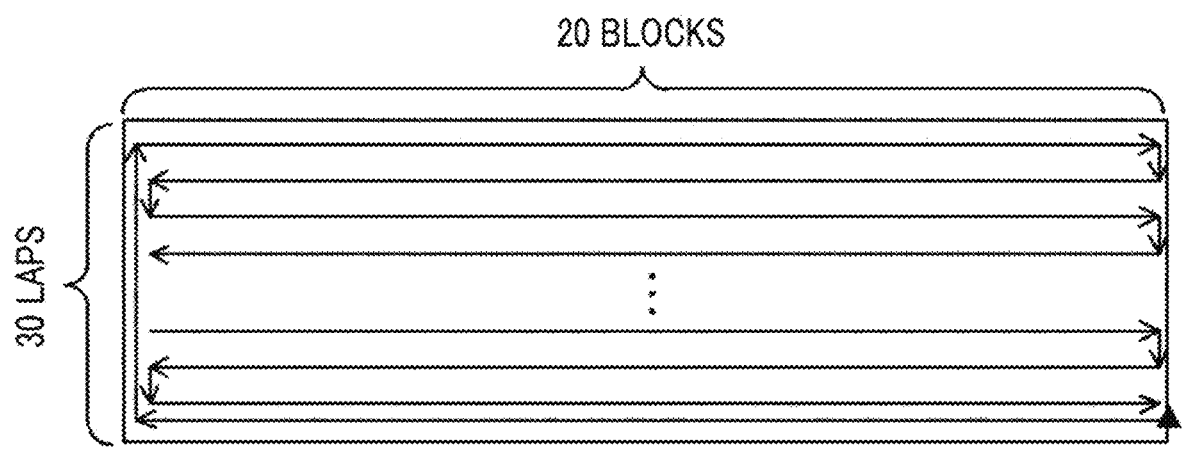
FIG. 5 is a plan view of an example of a movement path of a magnetic head in a case where the reading time of the data from the magnetic tape is the longest.

A longest time required in a case where the data to be read in the example of FIG. 4 is sequentially read is a time in a case where all pieces of data are read in order from the head on a path shown in FIG. 5. In the following, reading all pieces of data recorded in an area to be read in order from the head is referred to as "sequential reading". As shown in FIG. 5, in a case where the magnetic head H is located at an end of the area of 30 laps×20 virtual blocks (a position of a black triangle in the example of FIG. 5), first, it takes 50 unit times for the magnetic head H to reach the head of the area by moving 20 virtual blocks, switching a moving direction, and moving 29 laps. Next, in order for the magnetic head H to read the data for 600 virtual blocks, it takes 658 unit times to move 600 virtual blocks and move to the adjacent data track DT for 29 laps. Therefore, the longest time required to read the data in the example of FIG. 4 is 708 unit times.

Figure 6:
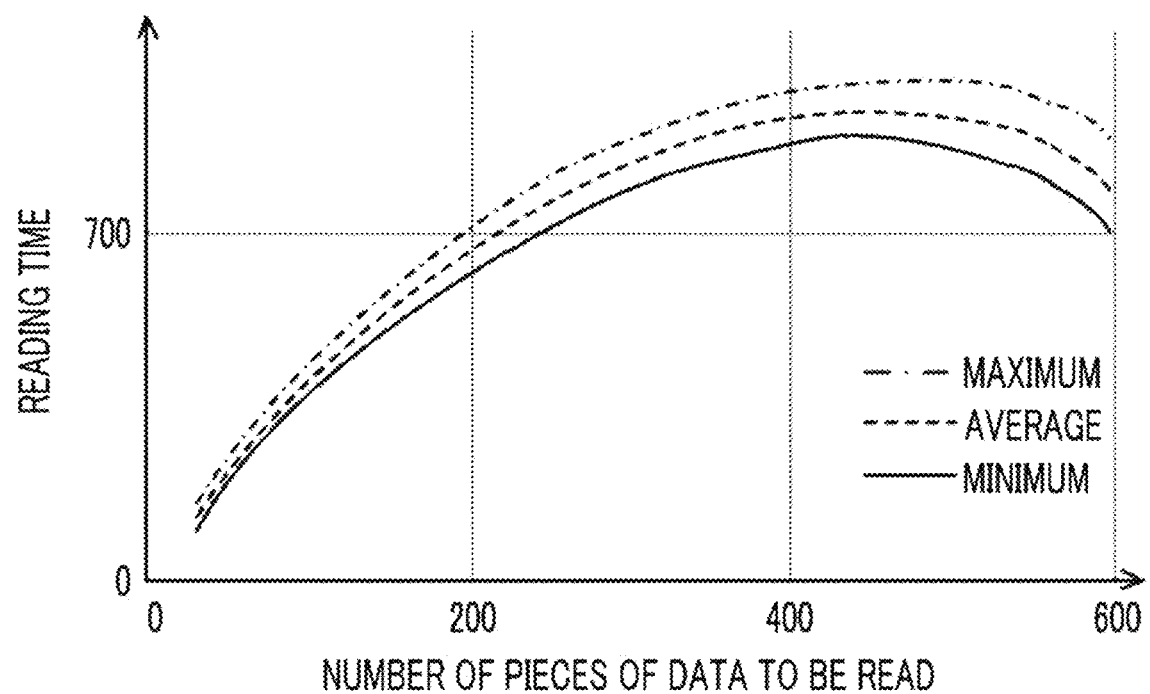
FIG. 6 is a graph showing an example of a relationship between the number of pieces of data to be read and the reading time.

Next, the reading time in a case where the data recorded in the area of 30 laps×20 virtual blocks of the magnetic tape T is read by using the pairwise exchange method as an example of a method of determining a data reading path (hereinafter referred to as "path determination method") will be described with reference to FIG. 6. The horizontal axis of FIG. 6 represents the number of blocks in which the data to be read of the 600 virtual blocks is recorded, and the vertical axis thereof represents the reading time in a case where the data to be read is read by the reading path determined according to the pairwise exchange method. FIG. 6 shows results obtained by performing simulations a plurality of times while changing a disposition position of the data to be read even with the same number of pieces of data. The solid line represents a minimum value, the broken line represents an average value, and the alternate long and short dash line represents a maximum value.

The pairwise exchange method is an improved method of the nearest neighbor method. The nearest neighbor method is a method in which a path for sequentially reading the data closest to the magnetic head H among a plurality of pieces of data to be read is determined as the reading path. The pairwise exchange method is a method in which a reading order of the last read data in the reading order determined by the nearest neighbor method is changed to an order of the head or between other consecutive pieces of data to evaluate the reading time. In the pairwise exchange method, a path with the shortest evaluated reading time is determined as the reading path. Since the nearest neighbor method and the pairwise exchange method are also described in JP2012-128937, further description thereof will be omitted.

As shown in FIG. 6, even though the pairwise exchange method is used to determine an optimum reading path, the reading time is longer as the number of pieces of data to be read increases and the longest reading time by the sequential reading (708 unit times in the example of FIG. 6) is exceeded from a point where the number of pieces of data exceeds 200 (33% of the total). The information processing device 12 according to the present embodiment derives the data reading path by the recording/reproducing element RWD based on a value representing a recording density of the data to be read.

Figure 7:
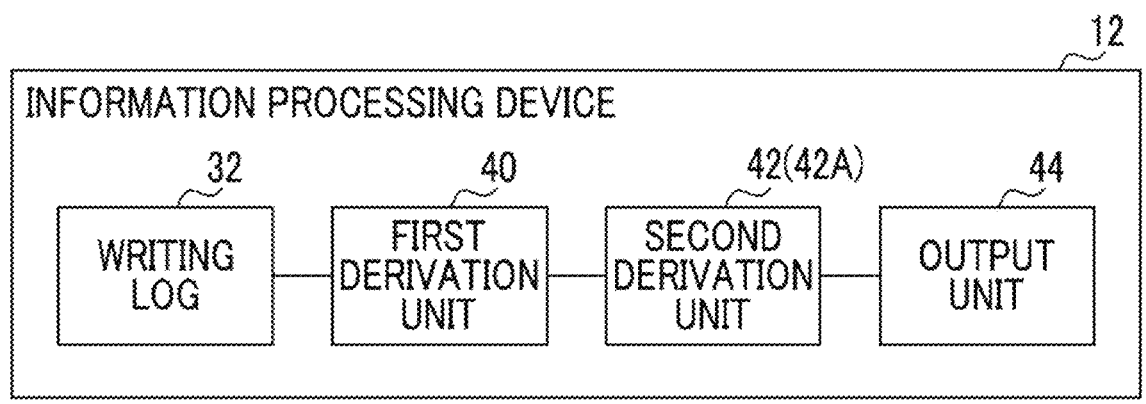
FIG. 7 is a block diagram showing an example of a functional configuration of the information processing device according to each embodiment.

Next, a functional configuration of the information processing device 12 according to the present embodiment will be described with reference to FIG. 7. As shown in FIG. 7, the information processing device 12 includes a first derivation unit 40, a second derivation unit 42, and an output unit 44. The CPU 20 executes the derivation program 30 to function as the first derivation unit 40, the second derivation unit 42, and the output unit 44.

Figure 8:
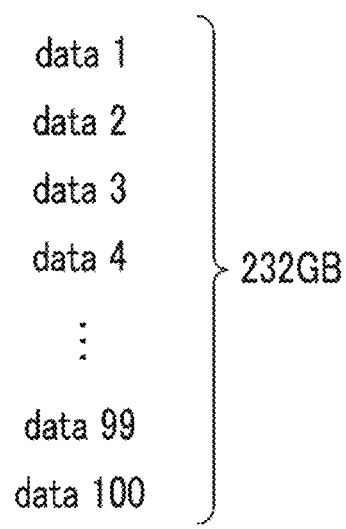
FIG. 8 is a diagram showing an example of all pieces of data stored in an area in which the data to be read is stored.

The first derivation unit 40 derives the value representing the recording density of the data to be read for each of a plurality of areas in which the plurality of pieces of data to be read are recorded. With reference to FIGS. 8 and 9, a processing of deriving the value representing the recording density of the data to be read by the first derivation unit 40 will be specifically described.

First, the first derivation unit 40 refers to the writing log 32 to derive the number of data tracks DT in which the plurality of pieces of data to be read are recorded. An example, a case where information representing that 100 pieces of data of data1 to data100 are sequentially recorded on the magnetic tape T is stored in the writing log 32 will be described as shown in FIG. 8. It is assumed that a total size of 100 pieces of data in this case is 232 GB and the data to be read is a plurality of pieces of data including data1 and data100 such as data1, data7, data98, and data100. It is assumed that a size of the data that can be recorded in one data track DT is about 58 GB by taking an uncompressed tape of LTO8 as an example.

In this case, it is presumed that the data to be read is recorded over the data tracks DT having the number of values obtained by dividing the total size of all pieces of data recorded sequentially including the data to be read from the head to the end by the size of the data that can be recorded in one data track DT. Therefore, in the above example, the first derivation unit 40 derives that the plurality of pieces of data to be read are recorded in 4 (=232÷58) data tracks DT, as shown in FIG. 9 as an example. The "plurality of areas in which the plurality of pieces of data to be read are recorded" according to the disclosed technique corresponds to the four data tracks DT in this case.

Next, the first derivation unit 40 divides the size of the data that can be recorded in one data track DT by an average value of sizes of the data to be read to derive the number of virtual blocks per one data track DT. Taking the uncompressed tape of LTO8 as an example, the size of data that can be recorded in one data track DT is about 58 GB. It is assumed that the average value of the sizes of the data to be read is 2.32 GB. In this case, the first derivation unit 40 derives the number of virtual blocks per one data track DT as 25 (=58/2.32).

The first derivation unit 40 derives the value representing the recording density of the data to be read for each of the derived number of data tracks DT. In the present embodiment, the first derivation unit 40 derives a ratio of the number of pieces of data to be read to the number of pieces of data that can be recorded in the data track DT as the value representing the recording density of the data to be read. In this case, for example, the first derivation unit 40 uses the number of virtual blocks per one data track DT as the number of pieces of data that can be recorded in the data track DT, and uses the number of virtual blocks in which the data to be read is recorded as the number of pieces of data to be read. This ratio is obtained, for example, by dividing the number of pieces of data to be read by the number of pieces of data that can be recorded in the data track DT.

The first derivation unit 40 may derive a ratio of the size of the data to be read to the size of the data that can be recorded in the data track DT as the value representing the recording density of the data to be read.

Further, the first derivation unit 40 derives the value representing the recording density with each of all combinations of two or more consecutive data tracks DT in the plurality of data tracks DT as one area. For example, in a case where the data to be read is recorded in the four data tracks DT as shown in FIG. 9, the first derivation unit 40 derives the value representing the recording density of ten patterns shown in FIG. 10. In FIG. 10, an area in a case where the value representing the recording density is derived is filled with gray.

The second derivation unit 42 derives a path for sequentially reading the data as the reading path for an area in which the value representing the recording density derived by the first derivation unit 40 is equal to or larger than a predetermined threshold value TH. The path for sequentially reading the data here means a path for sequentially reading all pieces of data stored in the data track DT in which the data to be read is stored from the head to the end. The second derivation unit 42 derives the reading path according to a predetermined path determination method for an area in which the value representing the recording density derived by the first derivation unit 40 is less than the threshold value TH. Examples of the path determination method include the nearest neighbor method and the pairwise exchange method.

Specifically, the second derivation unit 42 uses the union of areas where the value representing the recording density is equal to or larger than the threshold value TH, among all the areas from which the value representing the recording density is derived by the first derivation unit 40, as the area in which the value representing the recording density is equal to or larger than the threshold value TH. For example, a case where the first derivation unit 40 derives the value representing the recording density for patterns 1 to 10 shown in FIG. 10 and the values representing the recording density of only three patterns of patterns 1, 4, and 5 are equal to or larger than the threshold value TH will be described.

In this case, the second derivation unit 42 uses a data track 1 which is the area of the pattern 1, a data track 4 which is the area of the pattern 4, and data tracks 1, 2, and 4 which are the union of the data tracks 1 and 2 which is the area of the pattern 5 as the areas where the value representing the recording density is equal to or larger than the threshold value TH. Therefore, in this case, the second derivation unit 42 derives the path by sequential reading as the reading path for the data tracks 1, 2, and 4. In this case, the second derivation unit 42 derives the reading path according to a predetermined path determination method for the data track 3 as the area in which the value representing the recording density is less than the threshold value TH.

In the present embodiment, the second derivation unit 42 uses a smaller value as the threshold value TH as the area for which the value representing the recording density is derived is wider. Specifically, the second derivation unit 42 uses a smaller value as the threshold value TH as the number of data tracks DT for which the value representing the recording density is derived increases. The second derivation unit 42 may use a smaller value as the threshold value TH as the number of virtual blocks for which the value representing the recording density is derived increases.

For example, in the patterns 1 to 4 shown in FIG. 10, the second derivation unit 42 sets the threshold value TH to 0.33, which is larger than other patterns, since the area for which the value representing the recording density is derived is a width of one data track DT. In the patterns 5 to 7 shown in FIG. 10, the second derivation unit 42 sets the threshold value TH to 0.30, which is smaller than the patterns 1 to 4, since the area for which the value representing the recording density is derived is a width of two data tracks DT. In the patterns 8 and 9 shown in FIG. 10, the second derivation unit 42 sets the threshold value TH to 0.27, which is smaller than the patterns 5 to 7, since the area for which the value representing the recording density is derived is a width of three data tracks DT. In the pattern 10 shown in FIG. 10, the second derivation unit 42 sets the threshold value TH to 0.24, which is smaller than other patterns, since the area for which the value representing the recording density is derived is a width of four data tracks DT.

As described above, the reason why the threshold value TH is changed according to the width of the area is that the reading time of the sequential reading tends to be shorter than the reading by the reading path determined by the path determination method even though the data to be read is not dense as the area is wider. As the threshold value TH, for example, a value obtained in advance by simulation can be applied according to the width of the area and the path determination method used in a case where the value representing the recording density is less than the threshold value TH.

Figure 11:
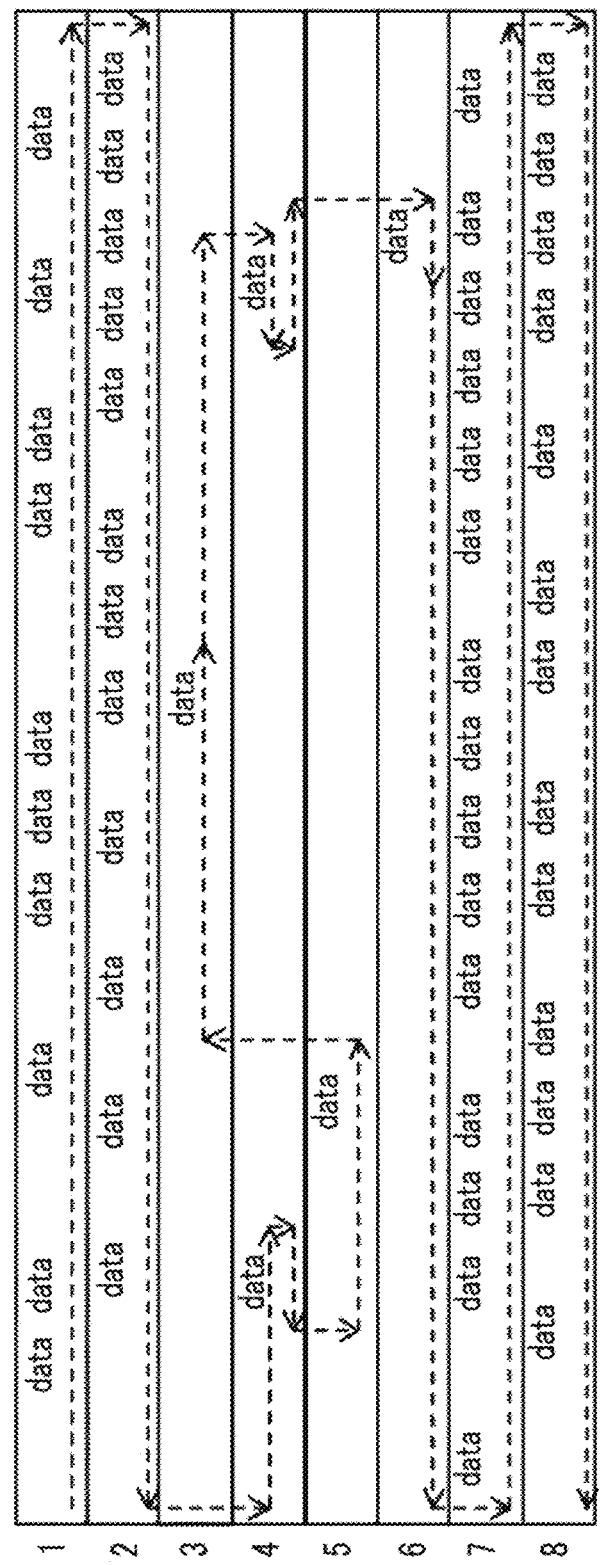
FIG. 11 is a diagram showing an example of a reading path according to a first embodiment.

FIG. 11 shows an example of the reading path of the data to be read by the recording/reproducing element RWD determined by the second derivation unit 42. The example of FIG. 11 shows a case where the data to be read is stored in eight data tracks DT. The example of FIG. 11 shows a case where the value representing the recording density in the data track DT area of tracks 1 and 2 and the data track DT area of tracks 7 and 8 is equal to or larger than the threshold value TH. The example of FIG. 11 shows a case where the value representing the recording density in the data track DT area of tracks 3 to 6 is less than the threshold value TH. The broken line arrow in FIG. 11 indicates the reading path of the data by the recording/reproducing element RWD.

As shown in FIG. 11, the recording/reproducing element RWD sequentially reads all pieces of data including data other than the data to be read in the area in which the value representing the recording density is equal to or larger than the threshold value TH. On the other hand, in the area in which the value representing the recording density is less than the threshold value TH, the recording/reproducing element RWD reads only the data to be read of all pieces of data stored in the area in the reading path according to the path determination method (the nearest neighbor method in the example of FIG. 11).

The output unit 44 outputs instruction information representing an instruction to read the data by the reading path derived by the second derivation unit 42 to the tape drive 18. For example, in the area in which the value representing the recording density is equal to or larger than the threshold value TH, the output unit 44 outputs the instruction information representing the instruction to sequentially read the data from the head to the end of the area to the tape drive 18. On the other hand, in the area in which the value representing the recording density is less than the threshold value TH, the output unit 44 outputs the instruction information representing the instruction to read the data to be read in the area in the reading order in a case where the reading is performed by the derived reading path to the tape drive 18.

Next, an action of the information processing device 12 according to the present embodiment will be described with reference to FIG. 12. The CPU 20 executes the derivation program 30 to execute a derivation process shown in FIG. 12. The derivation process shown in FIG. 12 is executed, for example, in a case where the information processing device 12 receives the instruction to read the data transmitted from the terminal 16.

Figure 12:
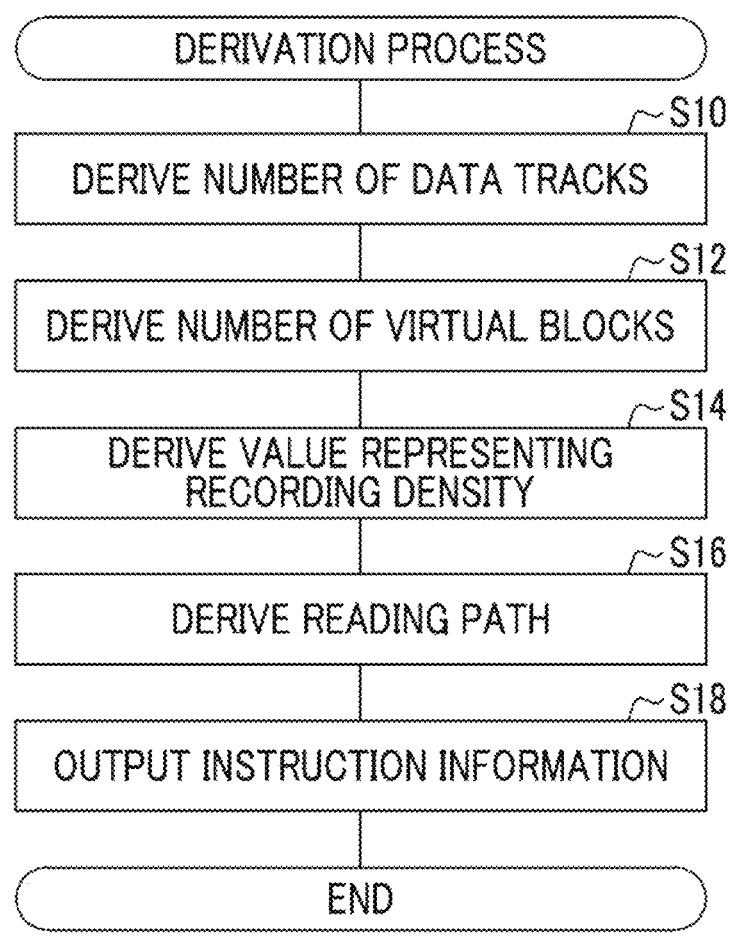
FIG. 12 is a flowchart showing an example of a derivation process according to the first embodiment.

In step S10 of FIG. 12, the first derivation unit 40 refers to the writing log 32 to derive the number of data tracks DT in which the plurality of pieces of data to be read are recorded. In step S12, the first derivation unit 40 divides the size of the data that can be recorded in one data track DT by the average value of the sizes of the data to be read to derive the number of virtual blocks per one data track DT.

In step S14, as described above, the first derivation unit 40 derives the value representing the recording density of the data to be read for each of the number of data tracks DT derived in step S10. Further, the first derivation unit 40 derives the value representing the recording density with each of all the combinations of two or more consecutive data tracks DT in the plurality of data tracks DT as one area.

In step S16, as described above, the second derivation unit 42 derives the path for sequentially reading the data as the reading path for the area in which the value representing the recording density derived in step S14 is equal to or larger than the threshold value TH. As described above, the second derivation unit 42 derives the reading path according to the predetermined path determination method for the area in which the value representing the recording density derived in step S14 is less than the threshold value TH. As described above, the second derivation unit 42 uses the smaller value as the threshold value TH as the area for which the value representing the recording density is derived is wider.

In step S18, as described above, the output unit 44 outputs the instruction information representing the instruction to read the data by the reading path derived in step S16 to the tape drive 18. The tape drive 18 reads the data to be read by the recording/reproducing element RWD according to the instruction information input from the output unit 44, and outputs the read data to the information processing device 12. The information processing device 12 discards the data other than the data to be read for the data read by the sequential reading. In a case where the process of step S18 ends, the main derivation process ends.

As described above, according to the present embodiment, the path for sequentially reading the data is derived as the reading path in the area in which the value representing the recording density is equal to or larger than the threshold value TH. In the area in which the value representing the recording density is less than the threshold value TH, the reading path is derived according to the predetermined path determination method. Therefore, as a result of selecting an appropriate reading path according to the recording density of the data to be read, it is possible to shorten the reading time of the data recorded on the recording medium.

Second Embodiment

A second embodiment of the disclosed technique will be described. The configuration of the recording/reading system 10 (refer to FIG. 1) and the hardware configuration of the information processing device 12 (refer to FIG. 3) according to the present embodiment are the same as those in the first embodiment, and the description thereof will be omitted.

A functional configuration of the information processing device 12 according to the present embodiment will be described with reference to FIG. 7. The functional unit having the same function as that of the first embodiment is designated by the same reference numeral as that of the first embodiment, and the description thereof will be omitted. As shown in FIG. 7, the information processing device 12 includes the first derivation unit 40, a second derivation unit 42A, and the output unit 44. The CPU 20 executes the derivation program 30 to function as the first derivation unit 40, the second derivation unit 42A, and the output unit 44.

Figure 13:
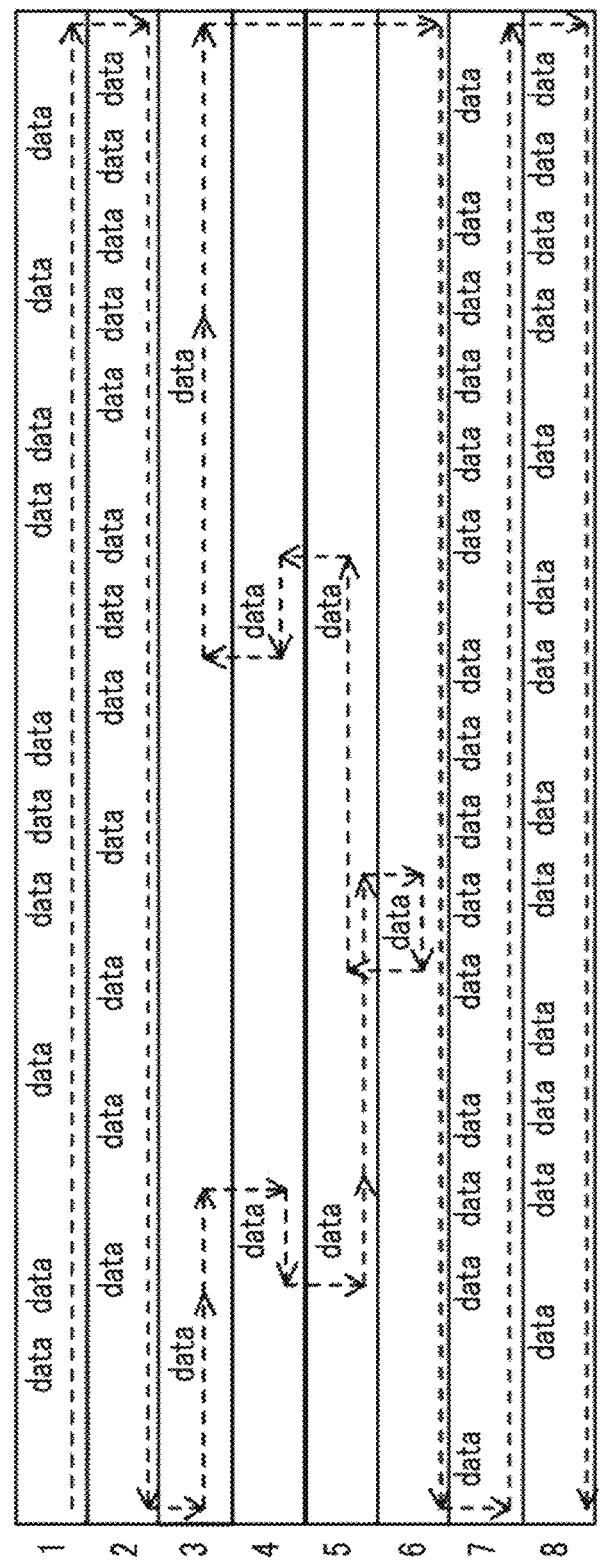
FIG. 13 is a diagram for describing a case where the reading path becomes long.

By the way, in the path determination method such as the nearest neighbor method and the pairwise exchange method, a position where the data is last read is a reading end position of the recording/reproducing element RWD. Therefore, as shown in FIG. 13 as an example, in a case where the area in which the value representing the recording density is equal to or larger than the threshold value TH (hereinafter referred to as "first area") is present behind the area in which the value representing the recording density is less than the threshold value TH (hereinafter referred to as "second area"), the following problems may occur. That is, in this case, a distance from a position after reading the last data to be read in the second area to a position at the head of the first area becomes relatively long. As a result, even though the optimum reading path is derived for the second area, the reading path as a whole including the first area may not be optimal. FIG. 13 shows an example in which the tracks 1, 2, 7, and 8 are the first areas, and the tracks 3 to 6 are the second areas.

In a case where the first area is present adjacently behind the second area, the second derivation unit 42A derives the reading path according to the path determination method with a start position of the recording/reproducing element RWD in the first area as an end position of the recording/reproducing element RWD in the second area. In a case where the first area is present adjacently in front of the second area, the second derivation unit 42A derives the reading path according to the path determination method with the end position of the recording/reproducing element RWD in the first area as the start position of the recording/reproducing element RWD in the second area.

Next, an action of the information processing device 12 according to the present embodiment will be described with reference to FIG. 14. The CPU 20 executes the derivation program 30 to execute a derivation process shown in FIG. 14. The steps of performing the same process as in FIG. 12 in FIG. 14 are designated by the same reference numerals and the description thereof will be omitted.

Figure 14:
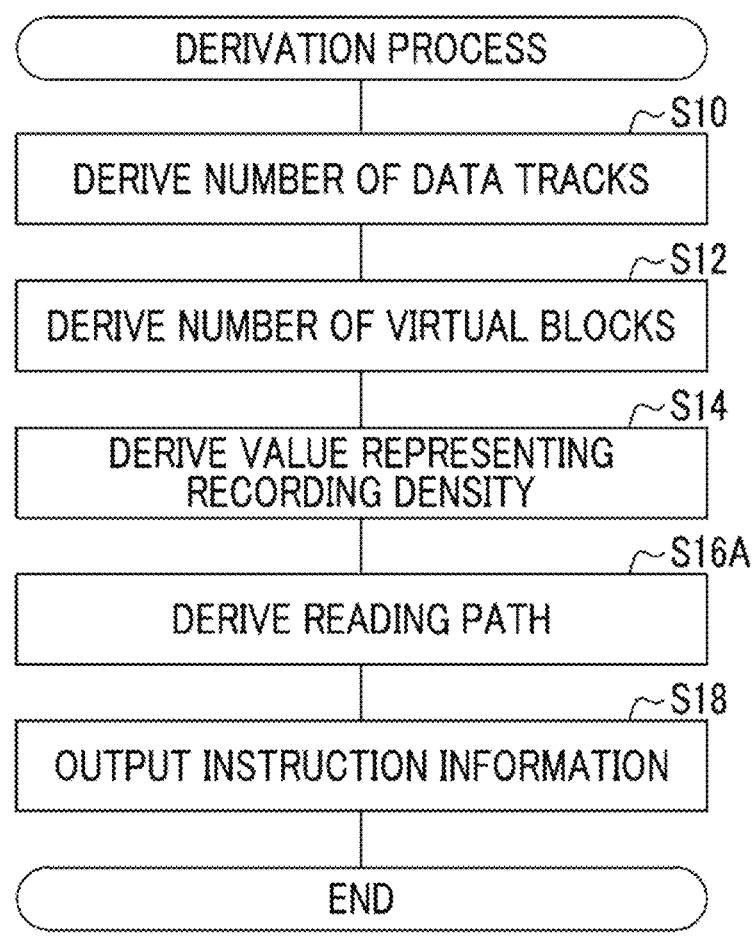
FIG. 14 is a flowchart showing an example of a derivation process according to a second embodiment.

In step S16A of FIG. 14, the second derivation unit 42A performs the following process different from step S16 according to the first embodiment only in a case where the second area is sandwiched between the first areas. That is, in a case where the first area is present adjacently behind the second area, the second derivation unit 42A derives the reading path according to the path determination method with the start position of the recording/reproducing element RWD in the first area as the end position of the recording/reproducing element RWD in the second area. In a case where the first area is present adjacently in front of the second area, the second derivation unit 42A derives the reading path according to the path determination method with the end position of the recording/reproducing element RWD in the first area as the start position of the recording/reproducing element RWD in the second area.

As described above, according to the present embodiment, the path length in a case of having the end of the first area immediately before as the starting point and the head of the first area immediately after as the end point is evaluated in the path determination method in the second area. Therefore, as a result of being able to select an appropriate path for the area as a whole, it is possible to further shorten the reading time of the data recorded on the recording medium.

In each of the above embodiments, the case where the magnetic tape is applied as the recording medium has been described, but the present invention is not limited thereto. A recording medium other than the magnetic tape capable of reading the data in the reading path determined by the sequential reading and the path determination method may be applied as the recording medium.

An artificial intelligence (AI) technique such as a genetic algorithm may be applied as the path determination method shown in each of the above embodiments.

In each of the above embodiments, it is possible to use the following various processors as a hardware structure of the processing units that execute various processes, such as the first derivation unit 40, the second derivation units 42 and 42A, and the output unit 44. As described above, the various processors include a programmable logic device (PLD) which is a processor whose circuit configuration is changeable after manufacturing such as an FPGA, a dedicated electric circuit which is a processor having a circuit configuration exclusively designed to execute specific processing such as an application specific integrated circuit (ASIC), and the like, in addition to the CPU which is a general-purpose processor that executes software (program) to function as various processing units.

One processing unit may be configured by one of the various processors or a combination of two or more processors of the same type or different types (for example, a combination of a plurality of FPGAs or a combination of a CPU and an FPGA). A plurality of processing units may be configured by one processor.

As an example of configuring the plurality of processing units with one processor, first, there is a form in which one processor is configured by a combination of one or more CPUs and software and the processor functions as the plurality of processing units, as represented by computers such as a client and a server. Second, there is a form in which a processor that realizes the functions of the entire system including the plurality of processing units with one integrated circuit (IC) chip is used, as represented by a system-on-chip (SoC) or the like. As described above, the various processing units are configured using one or more of the various processors as the hardware structure.

Further, more specifically, a circuitry combining circuit elements such as semiconductor elements can be used as the hardware structure of the various processors.

In each of the above embodiments, the form in which the derivation program 30 is stored (installed) in the storage unit 22 in advance has been described, but the present disclosure is not limited thereto. The derivation program 30 may be provided in a form of being recorded on a recording medium such as a compact disc read only memory (CD-ROM), a digital versatile disc read only memory (DVD-ROM), and a Universal Serial Bus (USB) memory. The derivation program 30 may be downloaded from an external device through a network.

What is claimed is:

1. A derivation device that derives a reading path for a reading element in a case where a plurality of pieces of data to be read are read from a recording medium, the device comprising:
    a memory; and
    a processor coupled to the memory and configure to:
    derive a value representing a recording density of the data for each of a plurality of areas in which the plurality of pieces of the data to be read are recorded, and
    derive a path for sequentially reading the data as the reading path for an area in which the value representing the recording density is equal to or larger than a predetermined threshold value, and derives the reading path according to a predetermined path determination method for an area in which the value representing the recording density is less than the threshold value;
    wherein the value representing the recording density is a ratio of a number of pieces of the data to be read to a number of pieces of data capable of being recorded in the area, or a ratio of a size of the data to be read to a size of the data capable of being recorded in the area.

2. The derivation device according to claim 1, wherein the threshold value is a value that is smaller as the area is wider.

3. The derivation device according to claim 1, wherein the processor is further configured to:
    in a case where a first area having the value representing the recording density equal to or larger than the threshold value is present adjacently in front of a second area having the value representing the recording density less than the threshold value, derive the reading path according to the path determination method using an end position of the reading element in the first area as a start position of the reading element in the second area, and
    in a case where the first area is present adjacently behind the second area, derive the reading path according to the path determination method using the start position of the reading element in the first area as the end position of the reading element in the second area.

4. The derivation device according to claim 1, wherein the processor is further configured to:
    derive the value representing the recording density by regarding each of all combinations of two or more consecutive areas in the plurality of areas as one area, in addition to each of the plurality of areas, and use a union of areas in which the value representing the recording density is equal to or larger than the threshold value, among all areas from which the value representing the recording density is derived by the first derivation unit, as an area in which the value representing the recording density is equal to or larger than the threshold value.

5. The derivation device according to claim 1, wherein the recording medium is a magnetic tape.

6. A derivation method of deriving a reading path by a reading element in a case where a plurality of pieces of data to be read is read from a recording medium, the method comprising:

deriving a value representing a recording density of the data for each of a plurality of areas in which the plurality of pieces of the data to be read are recorded; and deriving a path for sequentially reading the data as the reading path for an area in which the value representing the recording density is equal to or larger than a predetermined threshold value, and deriving the reading path according to a predetermined path determination method for an area in which the value representing the recording density is less than the threshold value;

wherein the value representing the recording density is a ratio of a number of pieces of the data to be read to a number of pieces of data capable of being recorded in the area, or a ratio of a size of the data to be read to a size of the data capable of being recorded in the area.

7. A non-transitory storage medium storing a program that causes a computer to perform derivation processing that derives a reading path by a reading element in a case where a plurality of pieces of data to be read is read from a recording medium, the derivation processing comprising:

deriving a value representing a recording density of the data for each of a plurality of areas in which the plurality of pieces of the data to be read are recorded; and deriving a path for sequentially reading the data as the reading path for an area in which the value representing the recording density is equal to or larger than a predetermined threshold value and deriving the reading path according to a predetermined path determination method for an area in which the value representing the recording density is less than the threshold value;

wherein the value representing the recording density is a ratio of a number of pieces of the data to be read to a number of pieces of data capable of being recorded in the area, or a ratio of a size of the data to be read to a size of the data capable of being recorded in the area.

* * * * *